United States Patent

Baum

[11] Patent Number: 5,811,193
[45] Date of Patent: *Sep. 22, 1998

[54] LOOP POLYMERS

[75] Inventor: Kurt Baum, Pasadena, Calif.

[73] Assignee: Fluorochem, Inc., Azusa, Calif.

[ * ] Notice: The term of this patent shall not extend beyond the expiration date of Pat. No. 5,703,163.

[21] Appl. No.: 864,549

[22] Filed: May 27, 1997

Related U.S. Application Data

[62] Division of Ser. No. 455,696, May 31, 1995, Pat. No. 5,703,163.

[51] Int. Cl.$^6$ .................................. B32B 9/04; C08F 8/00
[52] U.S. Cl. .......................... 428/447; 428/500; 525/100; 525/105; 525/106
[58] Field of Search ..................................... 525/100, 105, 525/106; 428/447, 500

[56] References Cited

U.S. PATENT DOCUMENTS

| | | | |
|---|---|---|---|
| 3,928,490 | 12/1975 | Hergenrother | 260/827 |
| 4,620,048 | 10/1986 | Ver Strate et al. | 585/10 |
| 4,769,417 | 9/1988 | Eichenauer et al. | 525/100 |
| 4,808,667 | 2/1989 | Goko et al. | 525/247 |
| 4,895,885 | 1/1990 | Foster et al. | 525/99 |
| 4,910,252 | 3/1990 | Yonehara et al. | 524/730 |

*Primary Examiner*—Randy Gulakowski
*Attorney, Agent, or Firm*—Joseph E. Mueth

[57] ABSTRACT

Novel loop polymers having a polymeric backbone and a plurality of olefinic groups which have been converted to closed loops by reaction with difunctional organic compounds reactive with said olefinic groups, said olefinic groups from which the loops are formed may either be present within the backbone and/or pendent from the polymeric backbone. The loop polymers may also have hydroxy or carboxy groups which can be capped with diisocyanates or epoxies, respectively.

9 Claims, No Drawings

LOOP POLYMERS

This is a divisional of application Ser. No. 08/455,696 filed on May 31, 1995 now U.S. Pat. No. 5,703,163.

The work embodied in this patent was carried out under Contracts N00014-91-C-0007 (Office of Naval Research) and DAAH01-93-C-R099 (ARPA), giving the Government rights to a royalty-free license.

BACKGROUND OF THE INVENTION

A classic way to improve the low-temperature properties of polymers is to add plasticizers, or moderate molecular weight fluid additives. There are disadvantages to this approach in that the plasticizers can be leached out by contacting fluids, resulting in change of the polymer properties that can occur over time. This phenomenon has been avoided by chemically anchoring the ends of long plasticizer molecules to the main chain as pendent chains. In the area of antifouling coatings for ship hulls, long term strength, and good low temperature properties are essential. Antifouling coatings containing tin or copper have been widely used. However, such coatings are toxic to useful sea life and their use is particularly objectionable in relatively enclosed areas such as harbors. Silicone polymers provide the best non-toxic antifouling properties that have been studied, but are weak due to the breakdown and reformation of linkages within the polymer, which manifests itself in dimensional instability. Strong polymers with the surface properties of silicones could be envisioned by the grafting of hydride terminated polysiloxanes onto a polyunsaturated olefinic polymer, such as polybutadiene, to give silicone pendent chains. The polybutadienes provides a resilient backbone which can stretch but does not undergo permanent deformation. However, there is no easy route to long-chain silicone mono hybrides. This approach has been reported using short-chain siloxanes, but only limited silicone content can be introduced in this way, Gabor, A. H.; Lehner, E. A.; Mao, A.; Schneggenburger, L. A.; Ober, C. K. Polym. Prepr. (ACS Div. Polym. Chem.), 1992, 33 (2), 136–7 who describe the hydrosilylation of styrene-butadiene block copolymers with pentamethyldisiloxane or 1,1,1,3,3,5,5-heptamethyl trisiloxane. The resulting polymers have pendant linear silicon-containing pendent chains. The use of difunctional alpha, omega-dihydropolysiloxanes, which are readily available, would be expected to give a rigid, crosslinked mass.

SUMMARY OF THE INVENTION

Briefly, this invention comprises novel loop polymers having a polymeric backbone and a plurality of olefinic groups which have been converted to closed loops by reaction with difunctional organic compounds reactive with said olefinic groups, said olefinic groups from which the loops are formed may either be present within the backbone and/or pendent from the polymeric backbone.

The loop polymers may also have hydroxy or carboxy groups which can be capped with diisocyanates or epoxies, respectively.

The loop polymers may contain residual hydride groups which, upon removal of solvent, will produce cross linking. If desired, cross-linking can be prevented by reacting any residual hydride group with an olefin.

According to this invention, it has been found that when the reaction between the polyunsaturated olefinic polymer and the alpha, omega-dihydropolysiloxane or other terminally difunctional compound reactive with olefinic groups takes place, preferably in dilute solution, the initial attachment gives a tethered reactive end that connects with a site on the same polymer molecule rather than a different one. Upon reaction completion, the result is the formation of a pendent-loop on the original polymer backbone. The structural shapes of polymers have in general been categorized as linear, branched and crosslinked, Odian, G. "Principles of Polymerization," McGraw-Hill Book Co., New York, N.Y., 1970, p. 16–19; Saunders, K. J., "Organic Polymer Chemistry," Chapman and Hall, New York, N.Y., 1988, p. 27–36; Allcock, H. R.; Lampe, F. W., "Contemporary Polymer Chemistry," Prentice Hall, Englewood Cliffs, N.J., 1990, p. 3–8. The properties of pendent-loop polymers are significantly different from those of other polymers. FIG. 1 illustrates the present invention and shows the formation of a single loop on the polymeric backbone. In reality a plurality of such loops are normally formed.

FIG. 1

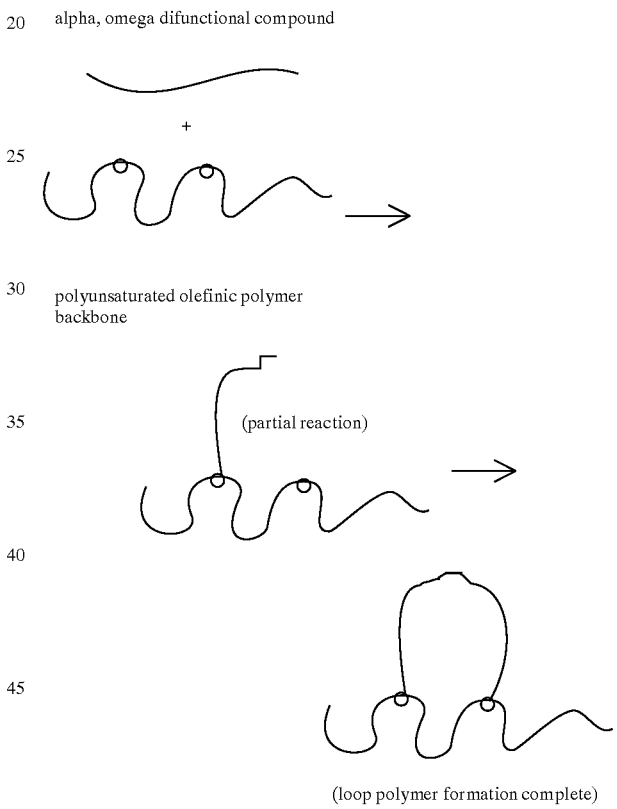

(loop polymer formation complete)

The polymeric end product is the encasement of the original olefinic polymer molecule in a three-dimensional sheath. If hydroxy-terminated polybutadiene (molecular weight of about 1000 to 5000) or other similar olefinic polymer is used, the adduct can be chain-extended with diisocyanates to form urethane linkages. The chain extension reaction can further include a tri or higher function reactant, such as a triol like glycerin, in which case the urethane final product is cross-linked. The relatively low molecular weight polydiolefin may be carboxy terminated such as carboxy terminated polybutadiene or polyisoprene in which case the complementary reactive chain extender would be an epoxy such as the diglycidyl ether of bis-phenol A. The chain extended and/or crosslinked polymer usually has an overall molecular weight of up to 500,000 or more.

If high molecular weight (molecular weight of 100,000 to 400,000, 500,000, or higher) polybutadiene, is used, chain extension is not needed to provide a tough, paint like coating, and solvent or thermoplastic processing can be used. In the high molecular weight polymers, any functional terminal groups present are unimportant.

The use of an excess of the alpha, omega-difunctional silane results in polybutadiene or other olefinic polymer adducts containing both pendent loops and hydride-terminated pendent chains. The adducts may or may not also contain hydroxy or other functional groups depending on functionality of the starting material. Any hydroxy groups can be used for chain extension with diisocyanate. The reactive ends of the pendent-chains can be capped with an olefin, such as ethylene or 3,3-dimethyl butene, or by hydrosilylation.

FIG. 2 shows the reaction of polybutadiene (PBD) with excess polydimethyl siloxane (PDMS) followed by capping of the —SiMe$_2$H end groups with ethylene.

FIG. 2

H(SiMe$_2$O)$_n$SiMe$_2$H +

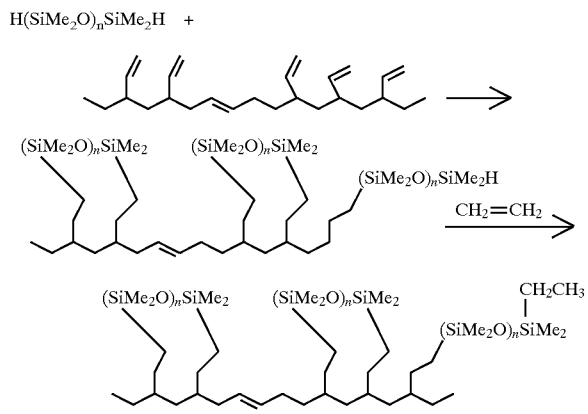

The novel loop polymers of this invention are particularly useful for and intended to be used as antifouling coatings on the hulls of ships to prevent the build-up of barnacles and the like which otherwise tend to accumulate during stays in port and reduce the performance including the speed of the ship when under way. More generally, the novel loop polymers are useful as molding materials, sealants and in those many other cases wherein polysiloxane polymers are currently used.

The polymeric backbone having olefinic pendent groups is typically a polydiolefin such as polybutadiene, polyisoprene, polychloroprene or the polymers resulting from the dehydrochlorination of polyepichlorohydrin which is described in U.S. Pat. No. 4,055,516 and U.S. Pat. No. 3,914,209. Polydehydrochlorinated polyepichlorohydrin has the following recurring structure:

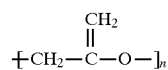

wherein n is an integer sufficient to provide a molecular weight of about 100,000 to 500,000 or more.

Another useful polymeric backbone is poly(norbornene). Poly(norbornene) has the following recurring structure:

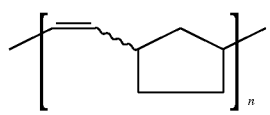

poly(norbornene)

wherein n is an integer sufficient to provide a molecular weight of about 100,000 to 500,000 or more.

The loops can be formed at the site of main chain olefinic double bonds or at the pendent double bonds or at both sites if present. For example, in the case of a polydiolefin like polybutadiene, the polymer normally contains both 1,2 and 1,4 linkages as follows:

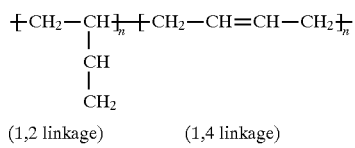

(1,2 linkage)      (1,4 linkage)

Functional terminal groups such as —OH, —COOH, SH and the like can be present, as noted above. The integers m and n are such that the overall molecular weight is from about 1000 to about 500,000.

In this preferred embodiment, m and n are integers such that the 1,2 linkages represent about 75–100% of the polymer molecular weight and the balance of 0–25% are 1,4 linkages. The loop forms primarily at the 1,2 linkages although it is quite possible to form loops at both the 1,2 and 1,4 olefinic sites. This is also true of the other polydiolefins such as polyisoprene and polychloroprene.

In the case of polydehydrochlorinated polyepichlorohydrin, the loops are obviously all on pendent chains. In poly(norborene), the loops are all formed in the main polymer chain.

The difunctional organic compounds reactive with the olefinic pendent groups are alpha, omega-hydride terminated polydimethyl siloxane.

Other alpha, omega hydride terminated siloxanes are known and are useful in this invention including those wherein some or all of the methyl groups are replaced by phenyl, cyano or polyfluoroalkyl groups.

The loop polymers of this invention are generally hydrophobic. The methods of applying the loop polymers to a ship hull are similar to those now used for a variety of types of paint. The material derived from hydroxy-terminated polybutadiene can be used in one-part or two-part polyurethanes. The polymeric material of this invention would merely replace the diols that are now used. Alternatively, when carboxy-terminated polybutadienes are used in place of hydroxy-terminated polybutadiene, the diacid can be cured with an epoxy resin. The adducts of high molecular weight polybutadiene are prepared in a solvent such as toluene. If the catalyst is left in the solution, the solution can be painted on the metal surface. When the solvent evaporates, the polymer crosslinks on the metal by reaction of the SiH groups with residual unlooped olefin groups. If the excess SiH groups are capped with an olefin, the loop polymer is not cross-linked and can be isolated and applied by any standard method, such as a water emulsion.

DESCRIPTION OF THE PREFERRED EMBODIMENTS

The hydrosilylation of alpha, omega-hydride terminated polydimethylsiloxane onto hydroxy-terminated polybutadiene (HPTB) was carried out using tris(triphenylphosphine)-rhodium(I) chloride as the catalyst. The alpha, omega-hydride terminated polydimethylsiloxane has the general formula:

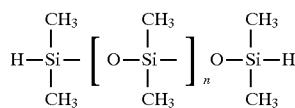

where n is 0 or an integer such as 1 to about 5 or 100 or more.

As noted above, some or all of the —$CH_3$ groups can be replaced by phenyl, cyano or polyfluoroalkyl groups containing from 1 to about 6 carbon atoms.

Commercially available HTPB ($M_n$ 1350) reacted with hydride-terminated polydimethylsiloxane (MW 400) in heptane or hexane as the solvent at 80–85 degrees C., and the reactions were complete in 4–5 days. None of the hydrosilylated HTPB samples showed indication of crosslinking.

Films were cast from a mixture of hydrosilylated HTPB and hexamethylene diisocyanate (HDI), cured first at 40 degrees C. and then at 75 or 100 degrees C. The films showed good toughness but were found to all be insoluble in common organic solvents. The properties did not vary significantly with small changes in the amount of isocyanate. The results indicate that crosslinking is occurring because of the presence of the rhodium hydrosilylation catalyst which was not removed.

A control experiment was carried out in which an excess of diisocyanate was reacted with HTPB (not hydrosilylated) in the presence of Wilkinson's catalyst. All the isocyanate was consumed, which demonstrates that the catalyst promotes the reaction of urethane bonds with isocyanate to give crosslinking.

When the HTPB was hydrosilylated using chloroplatinic acid, un-crosslinked films were obtained.

The following Examples are illustrative only. In the Examples, parts and percentages are by weight unless otherwise specified.

EXAMPLE 1

Tris(triphenylphosphine)rhodium(I) chloride (20 mg) was added to a solution of polydimethylsiloxane (MW 400, 3.33 g, 8.3 mmol) and hydroxy-terminated polybutadiene (MW 1350, 20% vinyl olefin (ethylene), 10 g, 7 mmol) in heptane (400 mL) and the solution was heated with stirring at 85 degrees C. for 4 days. Removal of solvent 12.3 g of a yellow-orange thick liquid product showing no remaining hydride seen by $^1$H NMR or FT-IR. The material was cured with hexamethylene diisocyanate to give a tough elastomer.

EXAMPLE 2

Hydroxy-Terminated Polybutadiene with Polydimethylsiloxane Pendent-Loops and Ethylene-Capped Pendent-Chains Tris(triphenylphosphine)rhodium(I) chloride (5 mg) was added to a solution of polydimethylsiloxane (MW 400, 14.8 g, 37 mmol) and hydroxy-terminated polybutadiene (MW 4900, 20% vinyl olefin (ethylene), 10 g, 2 mmol) in heptane (400 mL), and the mixture was heated with stirring at 85 degrees C. for 4 days. The mixture was then cooled to room temperature and transferred to a stirred autoclave. An additional 5 mg of catalyst was added. The autoclave was evacuated and pressurized to 70 psi with ethylene and heated 85 degrees C. with stirring. A 10 psi pressure drop was observed over 14 hours. The solvent was stripped to yield 23.1 g of an oily, opalescent brown product. No hydride remained on the basis of $^1$H NMR.

EXPERIMENTAL

Materials For Polybutadiene Reactions

Hydroxy-terminated polybutadiene of $M_n$ 1,350 and polybutadiene of $M_n$ 100,000 (1,2-syndiotactic) were used as received from Polysciences. Hydroxy-terminated polybutadiene of $M_n$ 1,230 and 2,800 was obtained from Atochem. The $M_n$ 220,000 polybutadiene (93% vinyl olefin) used as received from Scientific Polymer Products. Polydimethylsiloxane ($M_n$ 400) and trifluoropropylmethyldichlorosilane were obtained from Huels or PCR. Chlorodimethylsilane was obtained from Huels and then distilled under $N_2$ prior to use. Wilkinson's catalyst was purchased from Sigma Aldrich.

Hydrosilylations were run using polybutadiene of molecular weight 100,000 and 220,000 in hexane or toluene.

Sufficient dilution was used to avoid gelling (generally 1 to 10% concentration of the polydiolefin starting material, based on the total weight of the total solution). The solvent used was generally an organic hydrocarbon such as hexane, heptane or toluene. Wilkinson's catalyst or chloroplatinic acid were used.

EXAMPLE 3

Polydimethylsiloxane Pendent-Loop Polymer Based On 100,000 MW Polybutadiene

Tris(triphenylphosphine)rhodium(I) chloride (20 mg) was added to a solution of polydimethylsiloxane (MW 400, 1.48 g, 3.70 mmol) and polybutadiene (MW 100,000, 3 g, 0.03 mmol) in hexane (400 ml). The mixture was heated with stirring at 85 degrees C. for 7 days. Removal of solvent gave 12.3 g of a tough elastomeric film. The film was soluble in warm toluene.

EXAMPLE 4

Polydimethylsiloxane Pendent-Loop (1:1 Weight Ratio) Polymer based on 220,000 MW Polybutadiene Tris(triphenylphosphine)rhodium(I) chloride (50 mg) was added to a solution of polydimethylsiloxane (MW 400, 10 g, 25.00 mmol) and polybutadiene (MW 220,000, 93% vinyl olefin (ethylene), 10 g, 0.045 mmol) in hexane (1.5 l). The mixture was stirred at 85 degrees C. for 11 days. The reaction mixture was then treated with ethylene at 70 psi in a stirred autoclave at 85 degrees C. overnight. The solution was then filtered and cast on a Teflon mold to form a tough, transparent film.

EXAMPLE 5

Polydimethylsiloxane Pendent-Loop (3:1 Weight Ratio) Polymer Based On 220,000 MW Polybutadiene Tris(triphenylphosphine)rhodium(I) chloride (20 mg) was added to a solution of polydimethylsiloxane (MW 400, 6 g, 15.0 mmol) and polybutadiene (MW 220,000, 93% vinyl olefin (ethylene), 2 g, 0.009 mmol) in hexane (400 ml). The reaction mixture was then treated with ethylene at 70 psi in a stirred autoclave at 85 degrees C. overnight. The product solution was then filtered and cast on a Teflon mold to form a brownish-yellow film.

Film Coatings For Contact Angle Measurements

Glass slides coated with pendent-loop and pendent-loop/pendent chain adduct based on 100,000 MW PBD were subjected to contact angle studies. Films that were cast obtained from hexane solutions were clear and uniform after oven or vacuum drying. Films prepared from toluene solutions did not stick well to the smooth glass but clear, thick films were obtained when the surface of the slide was scoured with sandpiper. The measurements were stable after water immersion, an advancement over other coatings. A typical sample prepared from 4 g of hydride-terminated polydimethylsiloxane and 5 g of polybutadiene showed an advancing contact angle of 90 degrees and a receding contact angle of 50 degrees.

Having fully described the invention, it is intended that it be limited only by the lawful scope of the appended claims.

I claim:

1. Novel loop polymers having a polymeric backbone and a plurality of olefinic groups which have been converted to closed loops by reaction with difunctional organosilicon compounds reactive with said olefinic groups, said olefinic groups form which the loops are formed may either be present within the backbone and/or pendent from the polymeric backbone.

2. The novel loop polymers of claim 1 wherein the polymeric backbone is hydroxy terminated polybutadiene.

3. The novel loop polymers of claim 1 wherein the polymeric backbone is polyisoprene.

4. The novel loop polymers of claim 1 wherein the polymeric backbone is polychloroprene.

5. The novel loop polymers of claim 1 wherein the polymeric backbone is dehydrochlorinated polyepichlorohydrin.

6. The novel loop polymers of claim 1 wherein the polymeric backbone is poly(norbornene).

7. The novel loop polymers of claim 1 containing terminal hydroxyl groups capped with diisocyanates.

8. The novel loop polymers of claim 1 containing terminal carboxy groups capped with an epoxy compound.

9. A substrate carrying an antifouling coating comprising one of the loop polymers of claim 1.

* * * * *